United States Patent [19]
Gauthier

[11] 3,941,938
[45] Mar. 2, 1976

[54] TIME SHARED TCMF AND MF DECODER

[75] Inventor: John A. Gauthier, Brockville, Canada

[73] Assignee: GTE Automatic Electric (Canada) Limited, Brockville, Canada

[22] Filed: Sept. 27, 1974

[21] Appl. No.: 510,083

[52] U.S. Cl. ............................................ 179/18 EB
[51] Int. Cl.² ....................................... H04M 3/38
[58] Field of Search ....... 179/18 EB, 15 AT, 84 VF, 179/18 J

[56] References Cited
UNITED STATES PATENTS
3,671,677   6/1972   Lee et al. ..................... 179/18 EB Primary Examiner—Thomas A. Robinson

[57] ABSTRACT

A TCMF and MF decoder with common decoder section and separate TCMF and MF control sections. The decoder is time shared between two or more registers served on a first-come, first-served basis with priority assigned to one in case of identical seizure time. Strapping options are provided to allow the two registers to be both TCMF registers, or both MF registers, or one of each.

5 Claims, 7 Drawing Figures

TIME SHARED TCMF AND MF DECODER

CROSS REFERENCES TO RELATED APPLICATIONS

This invention is incorporated in the Register and Sender Arrangement by Moorehead and Gauthier, Ser. No. 510,081, filed the same day as this application.

BACKGROUND OF THE INVENTION

1. Field of the Invention

The invention relates to the decoding of TCMF and MF pulses for a telephone communication switching system, and more particularly for providing a TCMF and an MF decoder time shared in a single decoder.

2. Description of the Prior Art

The invention was developed for the system shown in U.S. Pat. No. 3,767,863, issued Oct. 23, 1973, by Borbas et al for a Communication Switching System with Modular Organization and Bus, hereinafter referred to as the System S2 patent.

The previous system is described in U.S. Pat. No. 3,487,173, issued Dec. 30, 1969, by Duthie et al for a Small Exchange Stored Program Switching System, hereinafter referred to as the System S1 patent. The registers and the associated decoders of the S1 System are disclosed in U.S. Pat. No. 3,678,197, issued July 18, 1972 by Panter et al for a Dial Pulse Incoming Trunk and Register Arrangement.

The S1 System has two separate and distinct types of registers. One is a basic DP (Dial Pulse) register which can be supplied with a TCMF (Touch Calling Multi Frequency) adapter to convert it into a DP and TCMF register. The second type of register is a MF (Multi Frequency) register which can only be used to receive MF tones. Both of these registers use NOR gate decoders which convert the output of the receivers into the binary hexadecimal code used by the registers.

In developing the System S2 a universal register was required. That is, one that could be strapped to receive TCMF or MF as well as still be capable of receiving the standard DP signals. In the particular arrangement of the S2 System four registers are provided in each module and therefore one card would have to contain all of the required circuitry for all four registers. A straight forward approach along the lines of the S1 System would have required both MF and TCMF decoders and control for each register, thereby requiring four of each. However, in operation once a register has been assigned to a specific type of receiver (MF or TCMF) then only one of the two decoders supplied would actually ever be used. A typical decoder requires approximately 10 integrated circuits for both decoding and control. Therefore the straight forward approach would require approximately 80 integrated circuits to be mounted on a single card. This is not only impractical but practically impossible.

SUMMARY OF THE INVENTION

According to the invention a common decoder is provided to control and decode TCMF or MF tones for two or more registers, with separate control circuits which are assigned to specific registers. The common decoder is then time shared between each register on a first-come first-serve basis with priority assigned to one in the event of identical seizure time. Strapping options, performed in a per register basis, allow the registers to be assigned for either TCMF or MF operation.

A first object of the invention is to provide a decoder which will decode TCMF and/or MF signals while still allowing the register to receive DP signals.

A second object of the invention is to decrease the number of components necessary to decode MF and TCMF signals.

A third object of the invention is to provide a time shared control of the decoder to allow a single decoder to be used with two registers.

A fourth object of the invention is to allow a single decoder to handle both an MF and a TCMF register.

A fifth and final object of the invention is to provide a decoder which can be time shared between four or more registers.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENTS

Figure 1:
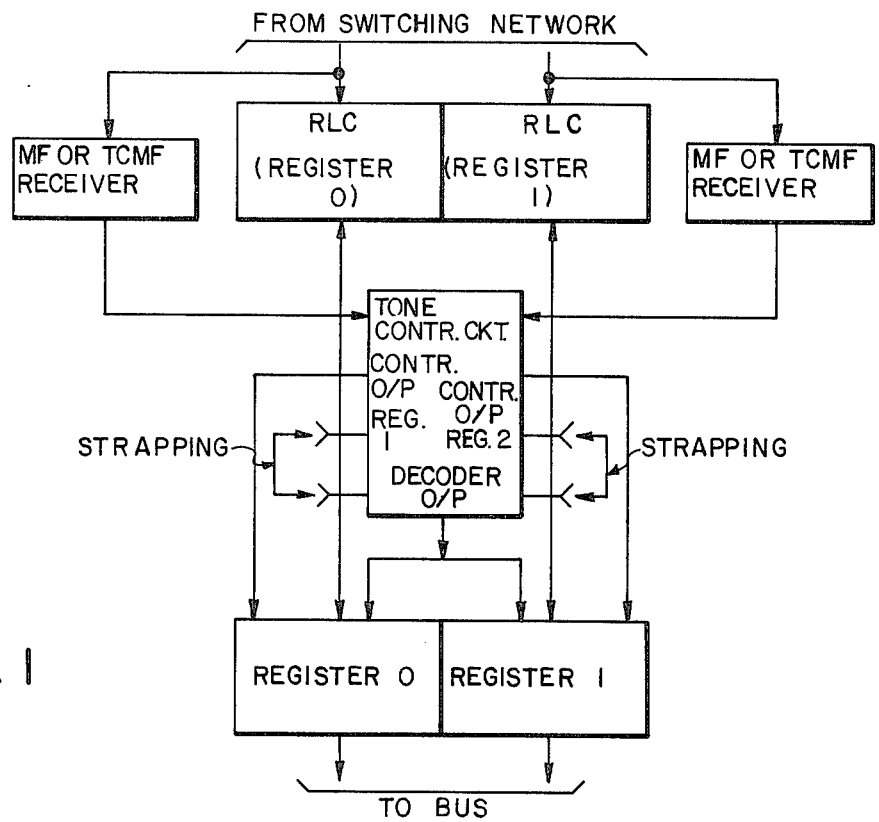
FIG. 1 is a block diagram of the improved time shared TCMF and MF decoder.

FIG. 1 shows a block diagram of the time shared TCMF and MF decoder as designed for two registers. For example, in a two register system three possibilities exist:

1. Both assigned for TCMF;
2. both assigned for MF; or
3. one assigned for TCMF and one assigned for MF.

The signals from the switching network are received by their respective MF or TCMF receiver and transmitted via the RLC (Register Line Circuit) module to the tone control circuit. (The RLC module is used only as a tie point for these signals). In the tone control circuit the signals are received by their associated control section which through the use of the common decoder clocks the decoded binary into their respective register. Both registers could be TCMF registers or both MF registers or they could be one of each as noted above. From the registers the information is sent to the bus to be further acted upon.

Figure 2A:
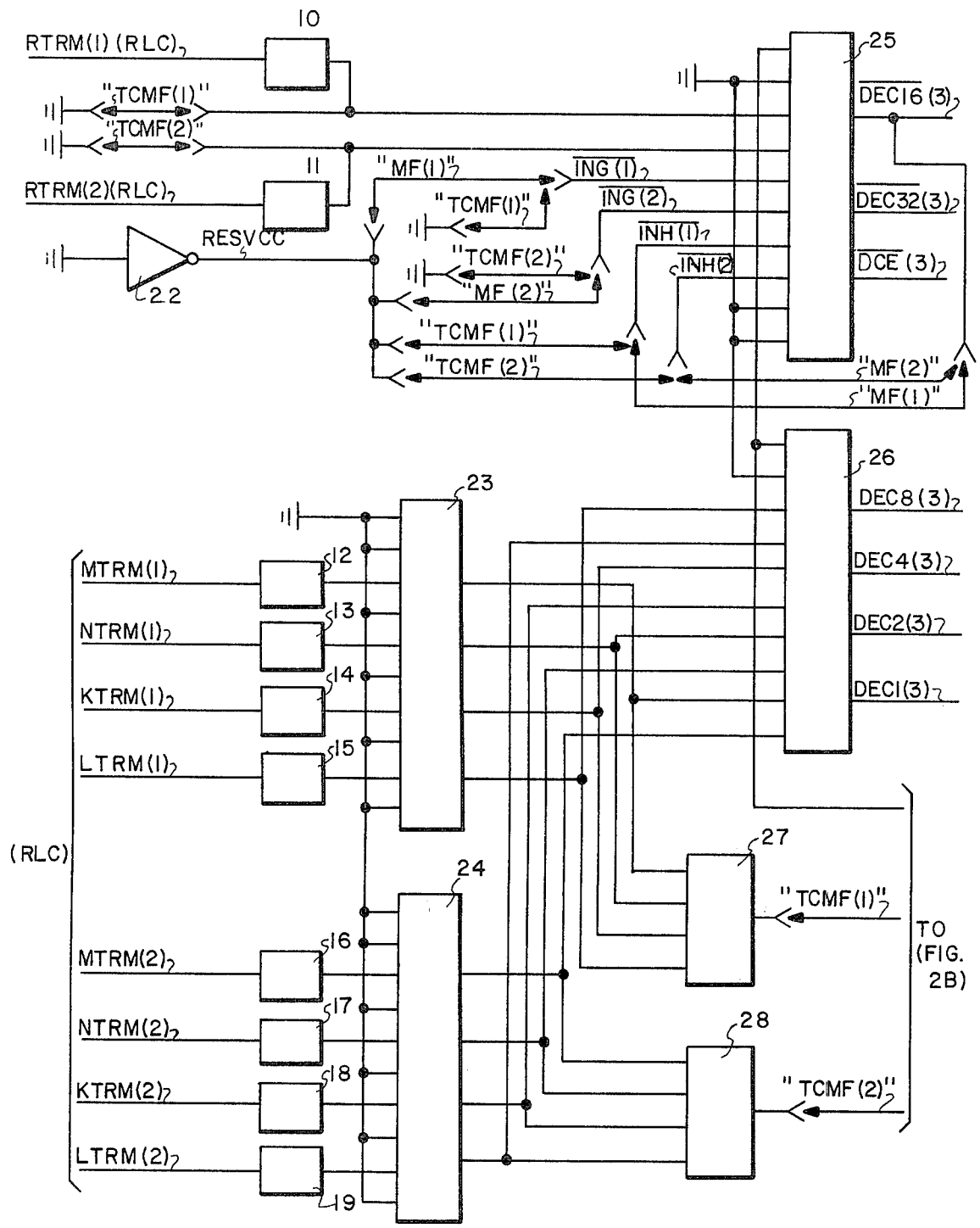
FIGS. 2A, 2B, and 3B are a schematic diagram of the control section of the decoder.
Figure 2B:
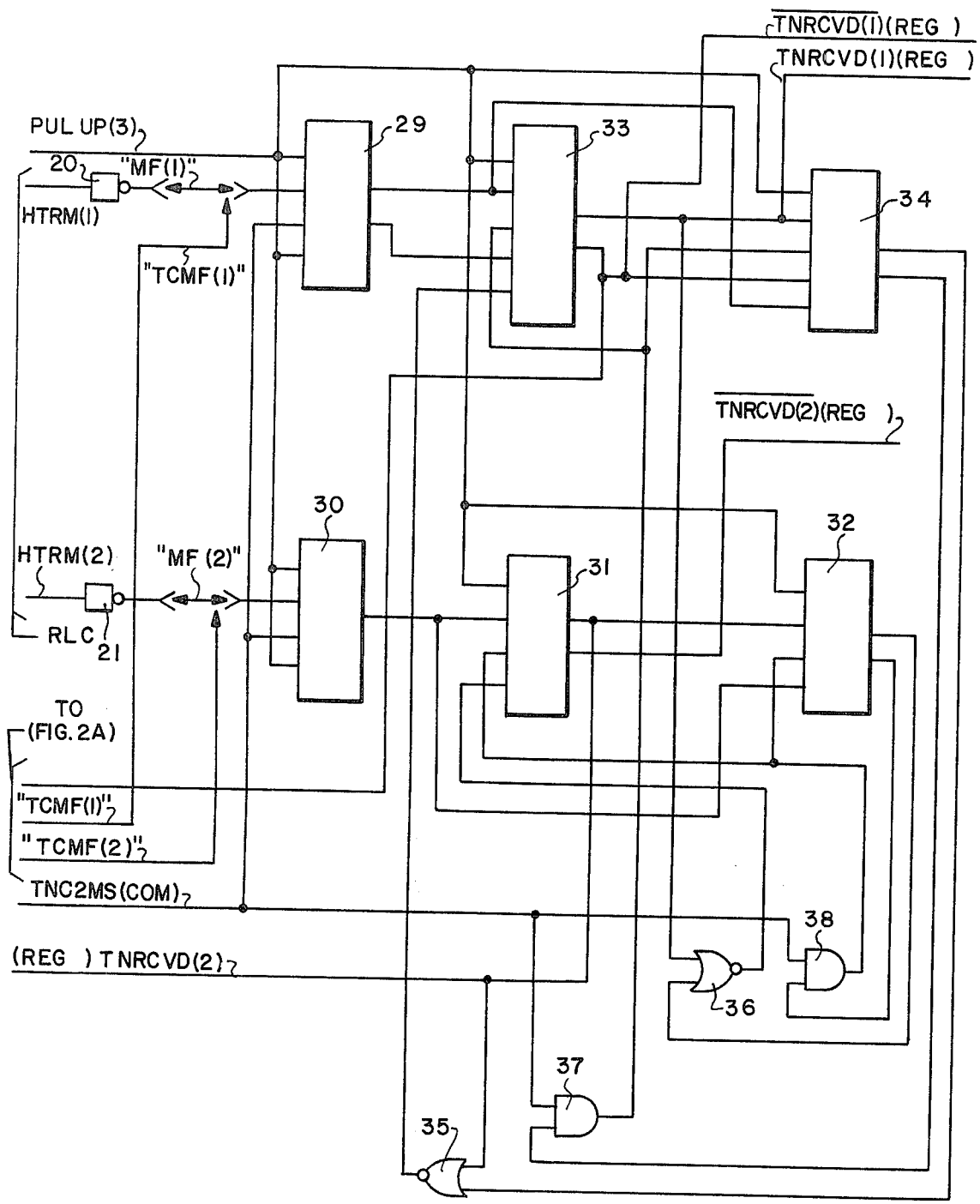

FIGS. 2A and 2B show the details of the decoder control section. The circuit is composed of commercial 7400-Series, Transistor Transistor Logic (TTL) with the exception of filters 10 through 21 which are of our own design. The filters are used merely as an interface between the electromechanical system and the electronic system of the circuit shown and are further described in co-pending application to Gauthier to a Software Oriented Sender, Ser. No. 510,084, filed the same day as this application. Inverter 22 is a 7404 hex inverter, multiplexers 23 through 26 are 74157 quad 2 to 1 multiplexers, gates 27 and 28 are 7420 dual 4 NAND gates, flip-flops 29 through 32 are 7474 dual D flip-flops, flip-flops 33 and 34 are 7476 dual JK flip-flops, gates 35 and 36 are 7402 dual 2 NOR gates, and gates 37 and 38 are 7408 quad 2 AND gates.

Figure 3A:
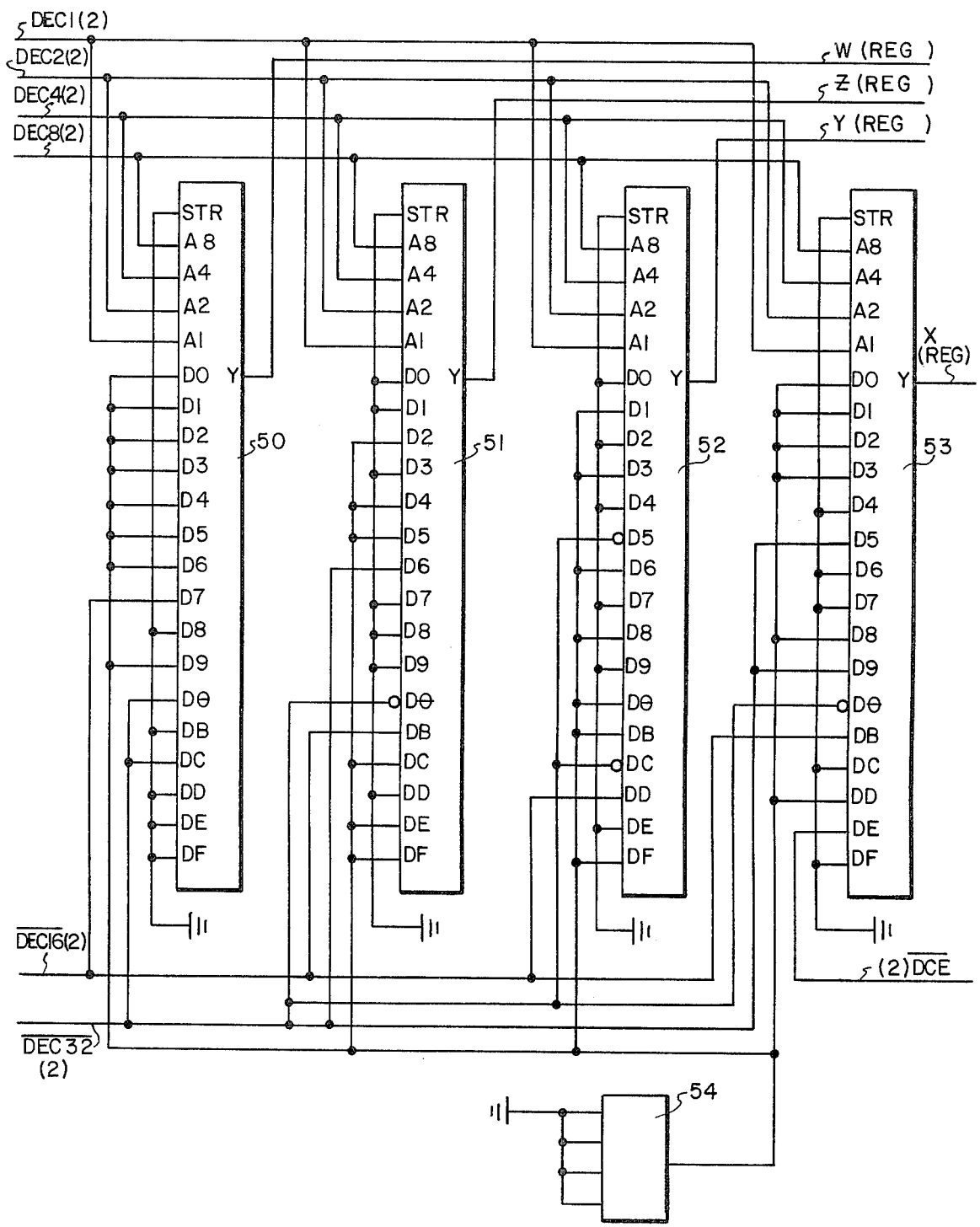
FIG. 3A is a schematic diagram of the decoding section of the decoder.

FIG. 3A shows the common decoding section of the decoder. Multiplexers 50 through 53 are 74150 16 to 1 multiplexers and gate 54 is a 7440 dual 4 NAND buffer gate.

Figure 3B:
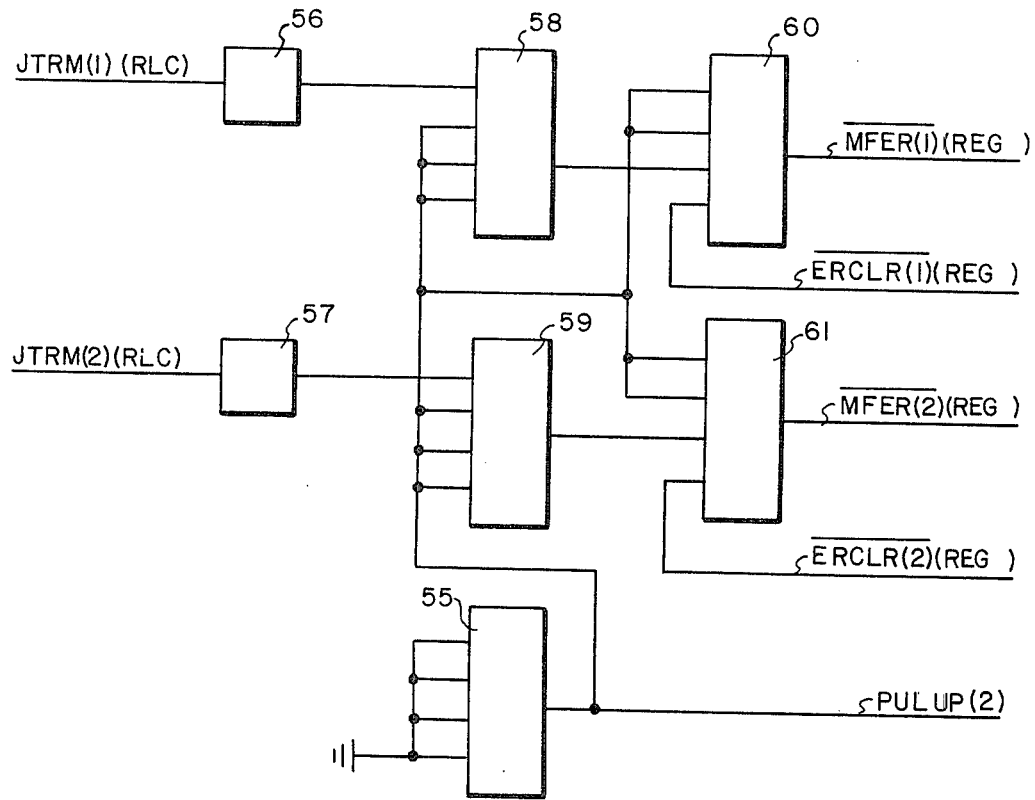

FIG. 3B shows the rest of the decoder control. Gate 55 is a 7440 dual 4 NAND buffer gate, filters 56 and 57 are the same as those noted in FIG. 2A, triggers 58 and 59 are 7413 dual 4 NAND (Schmitt) triggers, and flip-flops 60 and 61 are 7474 dual D flip-flops.

The tones received from either of the 2 receivers are first decoded into binary by the tone control circuit (multiplexers 50 through 53 and leads W, X, Y. and Z FIG. 3) and secondly this binary is then clocked into the register associated with the receiver via leads TNRCVD (1) and $\overline{\text{TNRCVD}}$ (1) of TNRCVD (2) and $\overline{\text{TNRCVD}}$ (2) depending upon which receiver is receiving the tones. The tone control inputs HTRM (1), JTRM (1), KTRM (1), LTRM (1), MTRM (1), NTRM (1), RTRM (1), INA (1), ING (1), INH (1), MF (1), TCMF (1), and TONE (1) are associated with outputs TNRCVD (1) and $\overline{\text{TNRCVD}}$ (1). Those same tone control inputs followed by postscript (2) are associated with outputs TNRCVD (2) and $\overline{\text{TNRCVD}}$ (2). This means that the receiver connected to inputs HTRM (1), etc. is always associated with the register connected to outputs TNRCVD (1) and $\overline{\text{TNRCVD}}$ (1). This is also true for inputs HTRM (2), etc. and their associated outputs TNRCVD (2) and $\overline{\text{TNRCVD}}$ (2). However, leads W, X, Y, and Z are shared between the two registers. In effect when tones are received by one of the receivers, the decoded binary is presented to both registers, however only the register associated with the receiver in question will actually load the binary information into its counter due to the separate control signals. A TCMF receiver is connected to the tone control circuit via only four leads: MTRM, NTRM, KTRM, and LTRM (the group (1) or (2) respectively depending on which part of the tone control circuit it is to be associated with). Each of these leads are normally high and when tones are received certain of them go low (depending on which-tones are received) and thus signal the tone control circuits that tones are present. The pattern which these leads may take when different digits are received is shown in table A along with their binary equivalents.

TABLE A

| TONES | INPUT LEADS | | | | HEXADECIMAL DECIMAL NOTATION | BINARY NOTATION | | | |
|---|---|---|---|---|---|---|---|---|---|
| | LTRM | KTRM | NTRM | MTRM | | 8 | 4 | 2 | 1 |
| H1, L1 | 0 | 0 | 0 | 1 | 1 | 0 | 0 | 0 | 1 |
| H2, L1 | 0 | 0 | 1 | 0 | 2 | 0 | 0 | 1 | 0 |
| H3, L1 | 0 | 0 | 0 | 0 | 3 | 0 | 0 | 1 | 1 |
| H1, L2 | 0 | 1 | 0 | 1 | 4 | 0 | 1 | 0 | 0 |
| H2, L2 | 0 | 1 | 1 | 0 | 5 | 0 | 1 | 0 | 1 |
| H3, L2 | 0 | 1 | 0 | 0 | 6 | 0 | 1 | 1 | 0 |
| H1, L3 | 1 | 0 | 0 | 1 | 7 | 0 | 1 | 1 | 1 |
| H2, L3 | 1 | 0 | 1 | 0 | 8 | 1 | 0 | 0 | 0 |
| H3, L3 | 1 | 0 | 0 | 0 | 9 | 1 | 0 | 0 | 1 |
| H2, L4 | 1 | 1 | 1 | 0 | Θ | 1 | 0 | 1 | 0 |
| H1, L4 | 1 | 1 | 0 | 1 | B | 1 | 0 | 1 | 1 |
| H3, L4 | 1 | 1 | 0 | 0 | C | 1 | 1 | 0 | 0 |

Besides the connections between the receiver and tone control circuit other strapping is also required. INA (1) and $\overline{\text{ING}}$ (1) or INA (2), and $\overline{\text{ING}}$ (2) must be strapped to ground depending again upon which section of the tone control circuit is to be used with this TCMF receiver. $\overline{\text{INH1}}$ or $\overline{\text{INH2}}$ must be strapped to lead RESVCC as shown on FIG. 2A. This simply provides a resistive pull up which is derived from the output of inverter 22. A connection must also be made from TCMF (1) to TONE (1) or from TCMF (2) to TONE (2). This connects the output of gate 27 or gate 28 to its input of flip-flop 29 or 30 respectively. This section is now capable of controlling and decoding TCMF for its associated register.

If an MF receiver is to be used instead, then the connection from receiver to tone control circuit is different, as well as the above mentioned strappings. In the MF receiver leads LTR (700), KTRM (900), NTRM (1100) and MTRM (1300) correspond to the above leads of the TCMF receiver and as such they should be connected to the same points. These leads present the decoder circuit with a completely different code to decode and table B illustrates the code presented and its hexadecimal equivalent.

TABLE B

| TONES | INPUT LEADS | | | | | | HEXADECIMAL DECIMAL NOTATION | BINARY NOTATION | | | |
|---|---|---|---|---|---|---|---|---|---|---|---|
| | (700) LTRM | (900) KTRM | (1100) NTRM | (1300) MTRM | (1700) RTRM | (F0) HTRM | | | | | |
| 700 & 900 | 0 | 0 | 1 | 1 | 1 | 0 | 1 | 0 | 0 | 0 | 1 |
| 700 & 1100 | 0 | 1 | 0 | 1 | 1 | 0 | 2 | 0 | 0 | 1 | 0 |
| 900 & 1100 | 1 | 0 | 0 | 1 | 1 | 0 | 3 | 0 | 0 | 1 | 1 |
| 700 & 1300 | 0 | 1 | 1 | 0 | 1 | 0 | 4 | 0 | 1 | 0 | 0 |
| 900 & 1300 | 1 | 0 | 1 | 0 | 1 | 0 | 5 | 0 | 1 | 0 | 1 |
| 1100 & 1300 | 1 | 1 | 0 | 0 | 1 | 0 | 6 | 0 | 1 | 1 | 0 |
| 700 & 1500 | 0 | 1 | 1 | 1 | 1 | 0 | 7 | 0 | 1 | 1 | 1 |
| 900 & 1500 | 1 | 0 | 1 | 1 | 1 | 0 | 8 | 1 | 0 | 0 | 0 |
| 1100 & 1500 | 1 | 1 | 0 | 1 | 1 | 0 | 9 | 1 | 0 | 0 | 1 |
| 1300 & 1500 | 1 | 1 | 1 | 0 | 1 | 0 | Θ | 1 | 0 | 1 | 0 |
| 1100 & 1700 | 1 | 1 | 0 | 1 | 0 | 0 | B (KP) | 1 | 0 | 1 | 1 |
| 1500 & 1700 | 1 | 1 | 1 | 1 | 0 | 0 | C (ST) | 1 | 1 | 0 | 0 |
| 900 & 1700 | 1 | 0 | 1 | 1 | 0 | 0 | D (STP) | 1 | 1 | 0 | 1 |
| 1300 & 1700 | 1 | 1 | 1 | 0 | 0 | 0 | E (ST2P) | 1 | 1 | 1 | 0 |
| 700 & 1700 | 0 | 1 | 1 | 1 | 0 | 0 | F (ST3P) | 1 | 1 | 1 | 1 |

Since some of these codes overlap, it is necessary to also use the RTRM (1700) signal in order to distinguish between these overlapping codes. Therefore lead RTRM (1700) from the MF receiver must be connected to lead RTRM (1) or RTRM (2) again depending upon which section is to be used. The rest of the leads including HTRM (FO) and JTRM (TXP) are brought to the tone control circuit from the associated MF receiver and connected to the (1) or (2) postscript associated leads depending upon which section is to be used with that receiver. The following strapping is also required: ING (1) or ING (2) is strapped to RESVCC, DEC16 is connected to INH (1) or INH (2), and finally MF (1) is connected to TONE (1) or MF (2) is connected to TONE (2). With the above connections made, then the chosen section of the tone control circuit is now capable of decoding and controlling MF as received from its associated MF receiver.

CIRCUIT OPERATION FOR TCMF

When a TCMF receiver is connected to the tone control circuit and tones are received one or more of LTRM (1), KTRM (1), NTRM (1) and MTRM (1) leads will go to a zero. This is in turn relayed through filters 12 through 15 (FIG. 2A) into the inputs of multiplexer 23. This multiplexer acts as a data selector and is used only for loading purposes in order to buffer the standard load capacity of the filter (1) to the standard load requirement of gate 27 and multiplexer 26 (2). Gate 27 will thus go to a 1 and in so doing will place a 1 on its input to flip-flop 29. When the positive going edge of the two millisecond clock (TNC2MS) is seen by the clock input of flip-flop 29 it will set and thus cause the inputs from it to flip-flop 33 to go to a 1 and a 0 respectively. The clockpulses may be derived from the control circuit (COM) or from a clock within this circuit itself. One millisecond later, when the negative going edge of the clock is seen flip-flop 33 will set. Since the decoding portion of the decoder is shared between sections one and two, only one section may use this decoding (multiplexers 50 through 53) at any one particular time. Therefore, when flip-flop 33 sets it will prevent flip-flop 31 in section two from setting via gate 36 which maintains a 0 on the clear input of flip-flop 31 for the length of time that flip-flop 33 is set. This is accomplished by the output of flip-flop 33 which is input to one lead of gate 36. The second output of flip-flop 33 causes a low to be input to its respective inputs of multiplexer 25 and 26. Thus the outputs of the data selector multliplexer 26 will relay the information present at the inputs. That is whatever code being received from the TCMF receiver on leads LTRM (1), KTRM (1), NTRM (1) and MTRM (1) will now be contained on leads DEC8, DEC4, DEC2, and DEC1 respectively. These outputs are placed on the inputs of multiplexers 50 through 53 on FIG. 3A and act as an address which will select one input (DO through DF). Depending on which code is present, one of the inputs (DO through DF) of the multiplexers will be gated to its output. Since the multiplexers (50 through 53) invert once internally, any one on its input will appear as a zero on its output and vice versa. If code 0000 is present (on the DEC leads) then the data present at the first input (DO) will be transferred to the output (inverted). Since the first input of multiplexer 50 and multiplexer 53 is a permanent 1 the output of these two will be a 0, while the first input to multiplexers 51 and 52 is a permanent 0 therefore they will output a 1. Thus 0011 will appear on leads X, Y, and Z, respectively which is a binary 3 and which is in fact the correct decoding according to table A.

When flip-flop 33 was originally set, it also caused lead TNRCVD (1) to go to a 1 and lead TNRCVD (1) to go to a 1. These signals fed to the associated register cause the binary digit contained on leads W, X, Y, and Z, to be loaded into the register. These two signals will remain true for approximately 2 milliseconds which allows plenty of time for the multiplexers 50 through 53 to settle down to the proper decoding. On the next negative going edge flip-flop 34 will set and cause flip-flop 33 to be reset. This is done via gate 35 which places a 0 on the clear input of flip-flop 33. Again gate 35 goes to a 0 because of its input from gate 34. The three flip-flops 29, 33, and 34, will now remain in their present state (1, 0, and 1 respectively) until LTRM (1), KTRM (1), NTRM (1), and MTRM (1), all return high again indicating the end of this particular TCMF pulse. Gate 27 will then go to a 0 and on the next positive going edge of the clock cause flip-flop 29 to reset. In resetting it causes flip-flop 34 also to reset due to the connection of the output of flip-flop 29 to the clear input of flip-flop 34. Now the circuit is back to the original state and is now ready to receive a new digit.

Section two of the tone control circuit works very similar to the above section one. However, of course it uses different equipment. This time the code is contained in inputs LTRM (2) KTRM (2), NTRM (2), and MTRM (2). Again considering TCMF operation, gate 28 will now go to a 1 and cause flip-flop 30 to set on the next positive going edge of the clock pulse. Multiplexer 24 is used for a similar purpose as multiplexer 23. When flip-flop 30 sets, it places a 1 on its input to flip-flop 31. Flip-flop 31 will on the next positive going edge set and cause TNRCVD (2) to go to a 1 and TNRCVD (2) to go to a 0. Due to the fact that flip-flop 33 of section one is now reset, a 1 is placed on its input to multiplexers 25 and 26. This input being at a 1 now causes leads DEC8, DEC4, DEC2, and DEC1, previously mentioned, to take on the information contained on inputs LTRM (2), KTRM (2), NTRM (2) and MTRM (2), respectively. Similarly whatever code is present on these leads will cause the multiplexers 50 through 53 to relay information from one of the other inputs to leads W, X, Y and Z. Thus since TNRCVD (2) and TNRCVD (2) are true this time, the register associated with this second production will now receive the decoded binary digit. Also, due to the second input of gate 35 being at a 1, a ground is maintained on the clear input of flip-flop 33 in section 1 thus preventing it from setting while flip-flop 31 is set. Although flip-flop 33 of section 1 and flip-flop 31 of section 2 perform the same function for their respective sections, they do so on opposite edges of the clock pulse. This is done in order to prevent any clashes should the two tone receivers become active at exactly the same moment. Flip-flops 29 and 30 are allowed to set at the same time but now, since the next edge of the clock is necessarily a negative going edge flip-flop 33 will set and thus prevent flip-flop 31 from setting until section 1 has finished with the decoders.

CIRCUIT OPERATION FOR MF

When an MF receiver is attached it is not necessary to detect a change in state of the LTRM, KTRM, NTRM, nad MTRM inputs via gates 27 or 28. Instead the HTRM (FO) signal from the MF receiver is used to signal the tone control circuit that tones are present. HRTM (1) or HTRM (2) are connected to the FO signal, with HTRM (1) being used to set flip-flop 29 of section 1 and HTRM (2) being used to set flip-flop 30 of section 2. When tones are present, the HTRM (FO) signal from the MF receiver and thus HTRM (1) or HTRM (2) goes to a 0. These leads are inverted after filters 20 and 21 and thus a 1 is presented to the associated flip-flop 29 or 30. The same sequence as explained for a TCMF receiver is now initiated.

This time however the code presented to the multiplexers 50 through 53 is derived from signals LTRM (700) KTRM (900), NTRM (1100), and MTRM (1300), from the MF receiver. Table B shows the code which these leads can follow and the hexadecimal equivalent.

Clashes between the codes presented by a TCMF receiver and that presented by an MF receiver are prevented by varying the contents of certain data inputs of the multiplexers 50 through 53. The following list of codes explains how both TCMF and MF decoding is handled.

1. code 0000 — data input "DO": Code 0000 is used only by the TCMF receiver and therefore it is wired so as to always produce a hexadecimal 3 (0011) on leads W, X, Y, and Z.
2. code 0001 — data input "D1": Code 0001 is not used by either MF or TCMF receiver therefore it is wired to always produce a hexadecimal 0 (0000) on leads W, X, Y, and Z.
3. code 0010 — data input "D2": Code 0010 is used only by the TCMF receiver and therefore it is wired to always produce a hexadecimal 2 (0010) on leads W, X, Y, and Z.
4. code 0011 — data input "D3": This code is used only by the MF receiver therefore, it is wired to always produce a hexadecimal 1 (0001) on leads W, X, Y, and Z.
5. code 0100 — data input "D4": Code 0100 is used only by the TCMF receiver, therefore it is wired to always produce a hexadecimal 6 (0110) on leads W, X, Y, and Z.
6. code 0101 — data input "D5": This code is used by both MF and TCMF receivers. It represents a hexadecimal 4 (0100) for TCMF and a hexadecimal 2 (0010) for MF. In order to accommodate both, inputs D5 of multiplexers 50 and 51 are wired to always produce a 0 on outputs W and Z. Secondly, multiplexer 53 is connected to lead $\overline{DEC32}$ and multiplexer 52 to DEC32. $\overline{DEC32}$ is controlled only by inputs 2D0 or 2D1 of multiplexer 25. $\overline{DEC32}$ must be at a 1 for MF decoding and at a 0 for TCMF decoding. Thus $\overline{ING1}$ must be connected to RESVCC if section 1 is to be associated with an MF receiver. $\overline{ING1}$ must be grounded if a TCMF receiver is used. This also holds true for ING2 and section 2. When code 0101 is seen for an MF receiver, due to DEC32 being at a 1 and $\overline{DEC32}$ being at a 0, a hexadecimal 2 (0010) is produced on outputs W, X, Y, and Z.

If a TCMF receiver is used a hexadecimal 4 (0100) is produced on leads W, X, Y, and Z.

7. code 0110 — data input "D6": This code represents a hexadecimal 5 (0101) for TCMF and a 4 (0100) for MF. Multiplexers 50, 53, and 52 are wired to always produce a 0, 1, 0 on leads W, X, and Y respectively. Multiplexer 51 however, is connected to lead DEC32. Since this lead is high for MF and low for TCMF, multiplexer 51 will produce a 0 when MF decoding is desired and a 1 when TCMF is desired.

MF - $\overline{DEC32}$ = 1
- 0100 is produced on leads W, X, Y, and Z;
TCMF - $\overline{DEC32}$ = 0
0101 is produced on leads W, X, Y, and Z.

8. code 0111 — data input "D7": Code 0111 is used only by the MF receiver but, however, it may represent one of two digits. The reason being that since these codes are generated only from leads LTRM(700), KTRM(900), NTRM(1100) and MTRM(1300), the 0 on lead LTRM(700) which means 700 Hz present can thus be accompanied by 1500Hz or 1700 Hz. Therefore, for this reason the RTRM (1700) lead is also used and is connected to inputs RTRM(1) or RTRM(2) depending on the section. When lead RTRM(1700) is true (low) (1700 Hz present) this means that 700 Hz and 1700 Hz are the tones which the MF receiver is receiving (ST3P) and therefore they must be wired to produce a hexadecimal F (1111) on leads W, X, Y, and Z. If $\overline{1700}$ is not true then tones 700 Hz and 1500 Hz, are the two tones which are being received and it is therefore necessary to produce a hexadecimal 7 (0111) on leads W, X, Y, and Z. Multiplexers 51–53 are wired to always produce a 111 on leads X, Y, and Z respectively. Mutliplexer 50 however is connected to lead $\overline{DEC16}$ which in turn is connected to multiplexer 25 output 1Y. If RTRM(1700) is true, $\overline{DEC16}$ = 0; RTRM(1700) is not true, $\overline{DEC16}$ = 1.

MF - RTRM(1700) true, $\overline{DEC16}$ = 0
- 1111 on leads W, X, Y, and Z;
- RTRM(1700) not true, $\overline{DEC16}$ = 1
- 0111 on leads W, X, Y, and Z.

9. code 1000 — data input "D8": Code 1000 is used only by the TCMF receiver, therefore it is wired to always produce a hexadecimal 9 (1001) on leads W, X, Y, and Z.
10. code 1001 — data input "D9": This code represents a 7 (0111) for TCMF and a 3 (0011) for MF. Multiplexers 50–52 are wired to always produce 0, 1 and 1 on leads W, Y, and Z respectively. Multiplexer 53 is connected to lead $\overline{DEC32}$.

| |
|---|
| MF - $\overline{DEC32}$ = 1 |
| - 0011 is produced on leads W, X, Y, and Z; |
| TCMF - $\overline{DEC32}$ = 0 |
| - 0111 is produced on leads W, X, Y, and Z. |

11. code 1010 — data input "DO": Code 1010 represents an 8 (1000) for TCMF and a 5 (0101) for MF. Multiplexer 52 is wired to always produce a 0 on lead Y. Multiplexers 51 and 53 are connected to lead $\overline{DEC32}$ and multiplexer 50 is connected to lead $\overline{DEC32}$.

| |
|---|
| MF - $\overline{DEC32}$ = 1, DEC32 = 0 |
| - 0101 is produced on leads W, X, Y, and Z; |
| TCMF - $\overline{DEC32}$ = 0, DEC32 = 1 |
| - 1000 is produced on leads W, X, Y, and Z. |

12. code 1011 — data input "DB": This code represents an 8 (1000) for MF if $\overline{1700}$ is not true or D (1101, STP) if $\overline{1700}$ is true. Multiplexer 50 is wired to always produce a 1 on lead W. Multiplexer 52 will always produce a 0 on lead Y. Multiplexers 51 and 53 are connected to lead DEC16 which goes to 0 when $\overline{1700}$ goes true.

| |
|---|
| MF - $\overline{DEC16}$ = 1, 1700 is not true |
| - 1000 is produced on leads W, X, Y, and Z; |
| - $\overline{DEC16}$ = 0, 1700 is true |
| - 1101 is produced on leads W, X, Y, and Z. |

13. code 1100 — data input "DC": Code 1100 represents a C (1100) for TCMF and a 6 (0110) for MF. Multiplexers 51 and 53 are wired to always produce 1 and 0 on leads X and Z repectively. Multiplexer 50 is connected to lead $\overline{DEC32}$ and multiplexer 52 to $\overline{DEC32}$.

| |
|---|
| MF - $\overline{DEC32}$ = 1, DEC32 = 0 |
| - 0110 is produced on leads W, X, Y, and Z; |
| TCMF - $\overline{DEC32}$ = 0, DEC32 = 1 |
| - 1100 is produced on leads W, X, Y, and Z. |

14. code 1101 — data input "DD": This code represents a 0 (1011) for TCMF and a 9 (1001) for MF if lead RTRM (1700) is true then it represents a B (1011) for MF. Multiplexers 50, 51, and 53 are wired to always produce 1, 0, and 1 on leads W, X, and Z respectively. Mutliplexer 52 is connected to $\overline{DEC16}$ which goes to 0 when lead RTRM (1700) goes true and is wired to 0 for TCMF via leads RTRM (1) or RTRM (2).

| |
|---|
| MF - $\overline{DEC16}$ = 1 (1700 Hz not present) |
| - 1011 is produced on leads W, X, Y, and Z; |
| - $\overline{DEC16}$ = 0 (1700 Hz present) |

-continued

| |
|---|
| - 1011 is produced on leads W, X, Y, and Z; |
| TCMF - $\overline{DEC16}$ = 0 |
| - 1011 is produced. |

15. code 1110 — data input "DE": This code represents a B (1010) for TCMF and a θ (1010) for MF when $\overline{1700}$ Hz is not present. When $\overline{1700}$ Hz is present it represents an E (1110) for MF. Multiplexers 50 and 52 are wired to always produce 1 on leads W, and Y. Multiplexer 51 is connected to lead $\overline{DEC32}$ and multiplexer 53 is connected to lead $\overline{DCE}$ which is high for TCMF and is connected to $\overline{DEC16}$ for MF.

| |
|---|
| TCMF - $\overline{DEC16}$ = 0, $\overline{DCE}$ = 1 |
| - 1010 is produced; |
| MF - $\overline{DEC16}$ = 1, $\overline{DCE}$ = 1 ($\overline{1700}$ not present) |
| - 1010 is produced; |
| - $\overline{DEC16}$ = 0, $\overline{DCE}$ = 0 ($\overline{1700}$ is present) |
| - 1110 is produced. |

16. code 1111 — data input "DF": This code is used only on MF and therefore it is wired to always produce C (1100) on leads W, X, Y, and Z.

Since the MF receiver is a much more precise receiver than the TCMF receiver, additional precautions are taken to insure wrong numbers are not recorded. Therefore lead JTRM (TXP) is used to signal the tone control circuit and thus the register when three or more tones are present on the line. This is an error indication. Leads JTRM (1) of section 1 or JTRM (2) of section 2 are connected to JTRM (TXP) of their associated MF receiver. When an error is seen lead JTRM (TXP) goes low causing trigger 58 or 59 to go high which in turn causes flip-flop 60 or 61 to set. In setting they cause leads $\overline{MFER}$ (1) or $\overline{MFER}$ (2) to go high which signals the register of the error condition. When the register has stored the error a zero is sent back on lead $\overline{ERCLR}$ (1) or $\overline{ELCLR}$ (2) which will reset the flip-flops. Thus the error is recorded.

Figure 4:
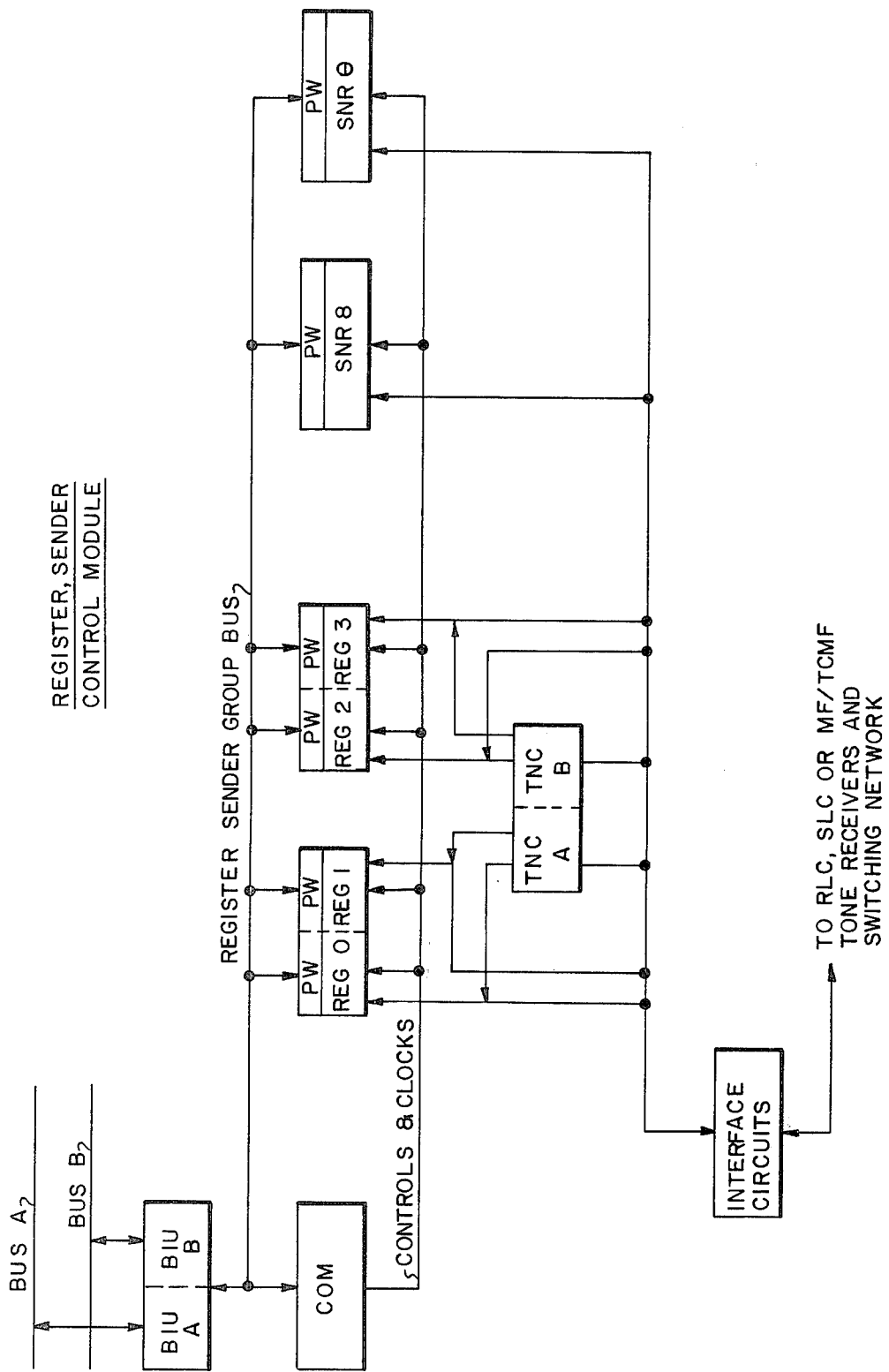
FIG. 4 is a block diagram of a register and sender group which could incorporate the invention.

FIG. 4 shows a particular register and sender arrangement which incorporates the decoder of the present invention designated TNC (A and B). Further details of this circuit are noted in copending application to Moorehead and Gauthier to a Register and Sender Arrangement. In this particular circuit two of the circuits of FIGS. 2A, 2B, 3A, and 3B are used in tandum to drive 4 registers.

Figure 5:
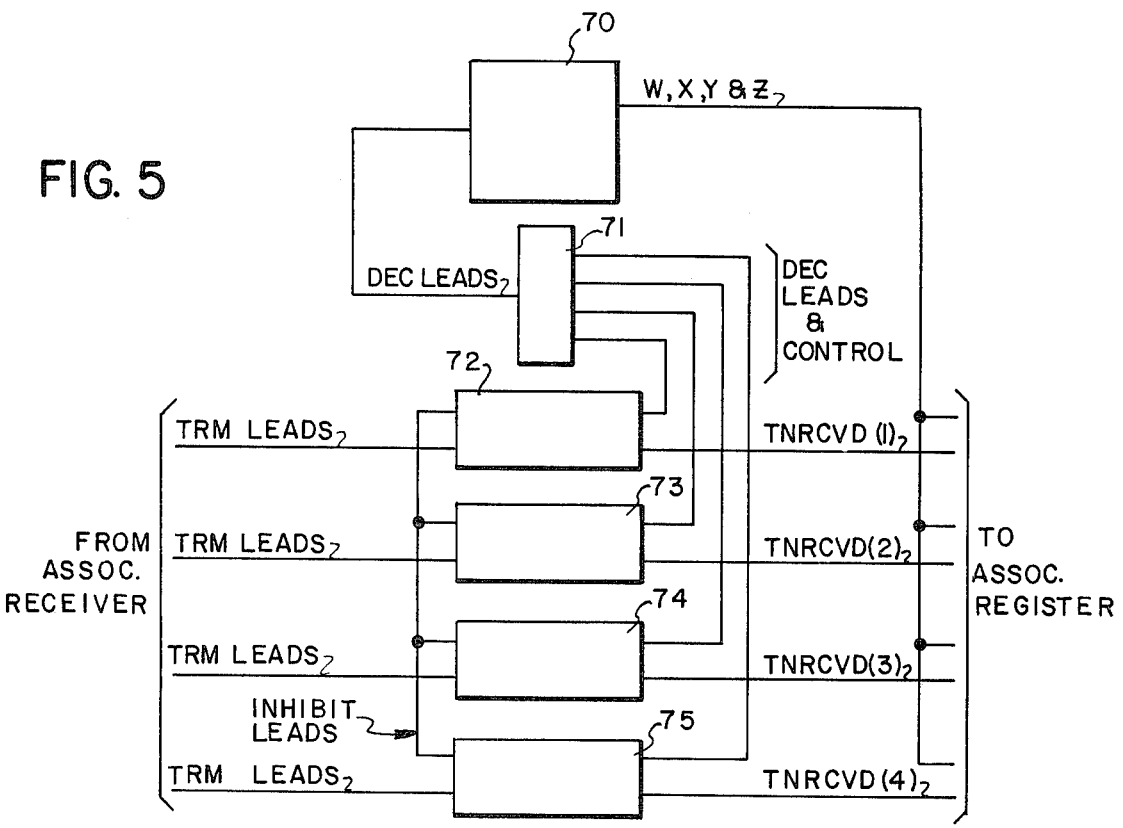
FIG. 5 is a block diagram of a TCMF and MF decoder system for four registers.

FIG. 5 shows a block diagram for a system which controls and decodes TCMF and MF for four registers. It is not necessary to increase the clock rate since the normal receiver output signal is 40 milliseconds. However, the clock rate could be increased in order ot accommodate shorter signal lengths. In this embodiment the TRM leads are brought into four control sections 72–75. The control sections are coupled to decoder section 70 by a four to one multiplexer 71. The circuit operation would then be similar to that described above.

While principles of the invention have been illustrated above in connection with specific apparatus and applications, it is to be understood the description is made only by way of example and not as a limitation on the scope of the invention as encompassed by the following claims.

I claim:

1. An improved decoder for a register and sender arrangement of a communication switching system, said arrangement comprising a plurality of registers and senders, a clock, TCMF and MF receivers, wherein TCMF, MF, and DP pulses are received by said receivers, and said TCMF and MF signals are transmitted to said decoder, said improved decoder comprising:
   TCMF decoder control means;
   MF decoder control means;
   common TCMF and MF decoder means for decoding both TCMF and MF signals; and
   time sharing control means coupled to said TCMF and said MF decoder control means;
   whereby said common TCMF and MF decoder means may be time shared by at least two MF or two TCMF registers or a TCMF register and an MF register.

2. An improved decoder as claimed in claim 1 further comprising:
   MF error indication means.

3. An improved decoder as claimed in claim 1 further comprising:
   register priority means.

4. An improved decoder as claimed in claim 1 further comprising:
   second TCMF decoder control means;
   second MF decoder control means; and
   second time sharing control means coupled to said TCMF and said MF decoder control means;
   whereby said common TCMF and MF decoder means may be time shared among at least four registers of any TCMF or MF combination.

5. An improved decoder as claimed in claim 4 further comprising:
   register priority means.

* * * * *